United States Patent [19]

Stover

[11] 4,223,948
[45] Sep. 23, 1980

[54] PROCESS FOR THE REDUCTION OF COMPETITIVE OXIDANT CONSUMING REACTIONS IN THE SOLUTION MINING OF A MINERAL

[75] Inventor: Dennis E. Stover, Plano, Tex.

[73] Assignee: Atlantic Richfield Company, Los Angeles, Calif.

[21] Appl. No.: 865,040

[22] Filed: Dec. 27, 1977

[51] Int. Cl.² ............................................. E21B 43/28
[52] U.S. Cl. ...................................... 299/4; 423/150;
423/658.5; 75/101 R; 75/117; 75/118 R;
75/119; 75/121; 423/20; 423/27
[58] Field of Search ............... 299/4, 5; 166/273, 274,
166/275; 75/101 R, 103; 423/17, 18, 20, 27, 32

[56] References Cited

U.S. PATENT DOCUMENTS

| 2,806,784 | 9/1957 | Martiny | 75/101 R |
|---|---|---|---|
| 2,896,930 | 7/1959 | Menke | 423/17 X |
| 2,992,887 | 7/1961 | Thunaes et al. | 423/17 |
| 3,089,885 | 5/1963 | Kruse | 423/20 X |
| 3,437,141 | 4/1969 | Brandner et al. | 166/273 |
| 3,469,630 | 9/1969 | Hurd et al. | 166/273 X |
| 3,607,069 | 9/1971 | Bruen et al. | 75/101 R X |
| 3,708,206 | 1/1973 | Hard et al. | 299/5 |
| 3,777,817 | 12/1973 | Feuerbacher et al. | 166/273 X |
| 3,860,289 | 1/1975 | Learmont | 299/4 |
| 3,865,435 | 2/1975 | Sareen et al. | 299/5 |
| 3,884,831 | 5/1975 | Bloom | 75/103 X |
| 3,985,855 | 10/1976 | Haskett | 423/27 |
| 4,032,194 | 6/1977 | Howell et al. | 299/4 |
| 4,080,419 | 3/1978 | Engelmann | 423/32 |
| 4,083,603 | 4/1978 | Stover | 299/4 |

Primary Examiner—Stephen J. Novosad
Assistant Examiner—George A. Suchfield
Attorney, Agent, or Firm—Ronnie D. Wilson

[57] ABSTRACT

The present invention relates to an improved method for the solution mining of a mineral from a subterranean formation. More specifically, the invention relates to an improved method which enhances significantly the recovery of the mineral from a subterranean formation via solution mining by reducing the oxidant consuming reactions which compete with the mineral for the oxidant injected therein.

10 Claims, No Drawings

PROCESS FOR THE REDUCTION OF COMPETITIVE OXIDANT CONSUMING REACTIONS IN THE SOLUTION MINING OF A MINERAL

Generally, known methods for solution mining of a mineral in situ utilize an acid or alkaline leach solution for the dissolution of the mineral. An oxidant is injected into the formation along with the leach solution. The mineral is leached from the formation and recovered from a production well via a pregnant leach solution. Various procedures for recovering the mineral from the pregnant leach solution are well known, such as ion exchange.

The process of the present invention is particularly suitable for the leaching of uranium; however, my invention is not so limited. The following description of the present invention will be applied to uranium leaching; however, it is apparent that it is applicable to leaching other mineral values such as copper, nickel, molybdenum, rhenium and selenium where similar problems are encountered.

Although acid leaching solutions can be used in some formations, only alkaline leaching solutions can practically be used where the particular formation contains significant quantities of acid-consuming gangue.

It is well known that to increase the recovery of uranium from an underground ore body, it is necessary to convert the relatively insoluble tetravalent state of uranium in the ore to the solubilizable hexavalent state. When using an alkaline leach solution, the dissolution of the uranium in solution occurs in two steps. The first step involves the oxidation of uranium and the second the dissolution of the oxidized uranium into the solution.

During a leaching operation utilizing alkaline solutions of ammonium carbonate, sodium carbonate, potassium carbonate and their respective bicarbonates in conjunction with the typical oxidants of air, oxygen, and hydrogen peroxide, uranium is oxidized and dissolved. The oxidation rate of uranium is dependent on the available concentration of oxidant in the formation. Uranium oxidation is not the sole reaction by which an oxidant is consumed during the in situ leaching of uranium.

It has been found that less than twenty percent of injected oxidant in a leaching operation is consumed directly in the formation of the soluble uranium species. The bulk of the remaining eighty percent of the injected oxidant is consumed in competitive heterogeneous reactions. It has further been found that less than five percent of injected oxidant is contained in the recovered uranyl ion species and that eighty-five to ninety percent of the remaining injected oxidant is consumed by the oxidant competing reactions in the formation. This causes a slower dissolution of uranium and a lower maximum concentration of uranium in solution. Therefore, there is needed a method whereby a formation containing a mineral such as uranium can be leached with a leach solution without being accompanied by excessive losses of oxidant and a diminished rate of mineral recovery.

Therefore, it is an object of the present invention to provide an improved method for the solution mining of a mineral from a subterranean formation, applicable generally to minerals requiring oxidation to be leached and to both acid and alkaline leach solutions.

A further object of the present invention is to provide an improved method for the solution mining of uranium.

It is an additional objective of the present invention to provide an improved method for the solution mining of uranium from subterranean deposits which reduces the oxidant competing reactions in a formation and thereby provides more oxidant for the oxidation of uranium and subsequent dissolution thereof.

Recent studies have shown that the uranium oxidation rate is a direct function of the available oxygen concentration in the formation. Therefore, the rate of uranium production and the uranium concentration in the effluent of the in situ leaching operation are determined to a significant degree by the amount of oxidant available to oxidize uranium at any location in the uranium bearing formation. The more oxidant available, the faster the rate of uranium oxidation and the greater the uranium concentration in the pregnant solution.

Some of the competing oxidant reactions include the oxidation of such minerals as pyrite and molybdenite. Because the total oxidant demand of these minerals and/or clays is orders of magnitude greater than that of the uranium minerals, this oxidant demand will not readily be exhausted within the normal life of an in situ leaching operation. Hence, for practical purposes, these minerals are infinite sinks for the injected oxidant.

It is clear that conventional oxidants such as oxygen and hydrogen peroxide are not specific for uranium but oxidize many other species present in the host formation. These gangue reactions consume the bulk of the injected oxidant (seventy to eighty percent) and continue to occur in the regions from which uranium has been leached (the barren zone). Thus, the oxidant available in the uranium leaching zone is significantly less than the injected concentration.

My studies demonstrate that an increased uranium production can be achieved by reducing the oxidant competing reactions in an in situ leaching operation, thereby increasing the supply of oxidant for the uranium minerals present in a formation.

The rate of uranium oxidation and, hence, production in a pattern is greatly increased by the inhibition of one or more of the competitive oxidant consuming reactions. A reduction of the oxidant demand of these competitive reactions from eighty to seventy percent (a ten percent reduction) of the total injected oxidant would increase the oxidant available for uranium by three hundred percent.

This reduction can be effected by introducing soluble organic or inorganic species into the injected leach solution which are capable of selective deposition or adsorption onto surface sites of one or more of the competitive, oxygen consuming minerals or clays. Such adsorption or deposition will inhibit or passivate the surface site to attack by oxygen ions or molecules, thus reducing the oxygen consumption.

It has been found that in order to obtain the desired selectivity for the deposition or adsorption one can utilize the fact that localized potential gradients exist between different ionic and mineral species within a solid ore matrix and that the fluid in contact with these species constitutes a flow path for mobile charged species. To better understand, view the various ionic and mineral species as anodes and cathodes of localized micro-galvanic cells. The introduction of soluble charges species in the vicinity of these localized potential gradients results in their transport by ionic conductance or electrophoresis to either the anodic or cathodic sites where deposition or adsorption occurs.

Soluble species of inhibitors or passivators suitable for the present invention include large organic species such as proteins and colloidal particles, also species of cathodic or anodic corrosion inhibitors.

Chemical additives which will give the desired effect include sodium benzoate, sodium silicate, monoethanolamine benzoate, triethanolamine phosphate, sodium orthophosphate, such organic salts as salicylates and the salts of cinnamic and nitrocinnamic acids.

In order to demonstrate, the effectiveness of the present invention, two, one-inch diameter glass columns, each packed with 200 grams of identical uranium ore samples are utilized. The ore is carefully maintained in its reduced state and contains approximately 0.1 percent uranium. An alkaline uranium leaching fluid of ammonium bicarbonate saturated with oxygen is flowed through the parallel columns at a constant rate of 0.3 ml per minute. One column serves as the baseline case with no gangue inhibitor added to its leachant feed. Leachant feed to the second column is continuously spiked with a dilute (ca. 1 percent) monoethanolamine benzoate solution. A total of 20 bed volumes of leachant are fed to the columns. The effluents are collected and analyzed. For the identical ore samples and operating conditions, effluent from the benzoate treated column contains 75 percent of the original uranium, whereas the effluent from the baseline column contains only 45 percent. The addition of monoethanolamine benzoate to the leachant results in the production of 67 percent more uranium.

Analysis of the phenomena shows that monoethanolamine benzoate forms insoluble surface complexes on microanodic sites in the ore. In the case of uranium-pyrite ore, the pyrite oxidation sites are anodic to the uranium sites such that monoethanolamine benzoate inhibits the oxidation of pyrite.

Therefore, the utilization of the present invention, the recovery of uranium via in situ leaching processes, can be enhanced significantly by most effectively using the available oxidant to oxidize uranium rather than gangue.

Having thus described my invention, I claim:

1. An improved method for the solution mining of a mineral from a subterranean formation containing same in which an injection and production well are drilled and completed within said formation, leach solution and an oxidant are injected through said injection well into said formation to dissolve said mineral, and said dissolved mineral is recovered via said production well, wherein the improvement comprises introducing into said formation a leach solution containing a chemical additive which reduces the oxidant consuming reactions therein other than those involving said mineral.

2. The improvement of claim 1 wherein said chemical additive is a soluble organic or inorganic species.

3. The improvement of claim 2 wherein said soluble organic species is selected from the group consisting of salts of salicylates, cinnamic and nitrocinnamic acids, sodium benzoate, monoethanolamine benzoate, and triethanolamine phosphate.

4. The improvement of claim 2 wherein said soluble inorganic species is selected from the group consisting of sodium silicate and sodium orthophosphate.

5. The improvement of claim 1 wherein said mineral is selected from the group consisting of copper, nickel, molybdenum, rhenium, selenium and uranium.

6. The improvement of claim 1 wherein said leach solution is acidic in nature.

7. The improvement of claim 6 wherein said acid leach solution is selected from the group consisting of hydrochloric and sulfuric acid.

8. The improvement of claim 7 wherein said alkaline leach solution is an aqueous solution of one or more salts selected from the group consisting of ammonium carbonate, sodium carbonate, potassium carbonate and their respective bicarbonates.

9. The improvement of claim 1 wherein said leach solution is alkaline in nature.

10. The improvement of claim 1 wherein said oxidant is selected from the group consisting of air, oxygen and hydrogen peroxide.

* * * * *